United States Patent [19]

Lepelletier

[11] Patent Number: 4,744,267
[45] Date of Patent: May 17, 1988

[54] TRANSMISSION SYSTEM, ESPECIALLY FOR AUTOMOBILE VEHICLES, WITH WIDE TORQUE AND SPEED RANGE

[75] Inventor: Pierre A. G. Lepelletier, Chatou, France

[73] Assignee: Valeo, Paris, France

[21] Appl. No.: 852,638

[22] PCT Filed: Jul. 1, 1985

[86] PCT No.: PCT/FR85/00179

§ 371 Date: Feb. 28, 1986

§ 102(e) Date: Feb. 28, 1986

[87] PCT Pub. No.: WO86/00676

PCT Pub. Date: Jan. 30, 1986

[30] Foreign Application Priority Data

Jul. 2, 1984 [FR] France .................................. 84 10455

[51] Int. Cl.$^4$ .................................................. F16H 57/10
[52] U.S. Cl. .......................................... 74/759; 74/740; 74/761; 74/763; 74/767
[58] Field of Search ................. 74/740, 758, 759, 760, 74/761, 763, 766, 767

[56] References Cited

U.S. PATENT DOCUMENTS

| | | | |
|---|---|---|---|
| 3,313,183 | 4/1967 | Bailey et al. | 74/740 X |
| 3,410,157 | 11/1968 | Livezey | 74/758 |
| 3,812,739 | 5/1974 | Mori et al. | 74/763 |
| 3,853,023 | 12/1974 | Mori et al. | 74/759 |
| 3,971,267 | 7/1976 | Murakami et al. | 74/759 |
| 4,223,571 | 9/1980 | Quemerais et al. | 74/759 |

FOREIGN PATENT DOCUMENTS

| | | |
|---|---|---|
| 1574726 | 6/1969 | France . |
| 1579317 | 7/1969 | France . |
| 2110072 | 5/1972 | France . |
| 2370199 | 6/1978 | France . |
| 137376 | 11/1978 | Japan .................................. 74/759 |

*Primary Examiner*—Leslie A. Braun
*Assistant Examiner*—Dwight G. Diehl
*Attorney, Agent, or Firm*—Charles E. Brown; Charles A. Brown

[57] ABSTRACT

The transmission system especially for automobile vehicles comprises an input gearbox (P) and a main gearbox (B) disposed between an input shaft (E) and an output shaft (S) and interconnected by an intermediate shaft (M). The transmission system comprises a series of numerous progressively distribution forward running ratios and a simple control system. Reverse running is obtained by means of the input gearbox (P), which enables gear ratios of the same order to be obtained in reverse running as in forward running and further provides a supplementary forward running ratio at the top of the series of ratios. A gearing down mechanism (TL) may be added to the main gearbox (B) to widen the range of transmission ratios in both directions.

16 Claims, 9 Drawing Sheets

TRANSMISSION SYSTEM, ESPECIALLY FOR AUTOMOBILE VEHICLES, WITH WIDE TORQUE AND SPEED RANGE

The present invention relates to a transmission system, especially for automobile vehicles, comprising an input gearbox and a main gearbox disposed between an input shaft and an output shaft and interconnected by an intermediate shaft, the input gearbox having a free neutral setting in which the intermediate shaft is decoupled from the input shaft and freely rotatable and a sequence of forward gear ratios in which the intermediate shaft is coupled to the input shaft with a variable forward gear ratio, input gearbox control means by means of which the input gearbox is selectively placed in its free neutral setting or in a forward gear with a ratio selected from said sequence of ratios, the main gearbox comprising a double planet gear with four elements including a first element coupled to the intermediate shaft, a second element, a clutch by which the second element is selectively coupled to the input shaft or disengaged, a third element coupled to the output shaft, a fourth element, and a brake by which the fourth element is selectively immobilized or released, said main gearbox having three forward running ranges respectively referred to as slow, intermediate and fast, such that: in the slow range the second element is released and the fourth element is immobilized, in the intermediate range the second element is coupled to the input shaft and the fourth element is immobilized, and in the fast range the second element is coupled to the input shaft and the fourth element is released, so that the transmission system has three forward running operating modes: a slow mode in which the input gearbox is in a forward gear and the main gearbox in the slow range, an intermediate mode in which the input gearbox is in its free neutral setting and the main gearbox is in the intermediate range, and a fast mode in which the input gearbox is in a forward gear and the main gearbox is in the fast range, a change of gear ratio within the sequence of forward gear ratios of the input gearbox varying the transmission system slow mode ratio in the same sense and the transmission system fast mode ratio in the opposite sense.

A transmission system of this type is described in U.S. Pat. No. 3,505,905 (LEPELLETIER) and is of considerable benefit for all sorts of automobile vehicle and more particularly for heavy goods vehicles, to the remarkable extent that it makes it possible to achieve at the same time: a distribution of the gear ratios with a good progression procuring both excellent conditions of insertion into traffic and economical fuel consumption by virtue of close together higher gear ratios; and simple control conditions to the extent that, in order to change from any ratio to an adjacent ratio, or even to skip a ratio, it is only necessary to operate at most two of the transmission control devices, such as clutches or brakes, and this with a range of values of torque and speed in forward running which is remarkably extended, frequently between 10 and 13, for example.

In U.S. Pat. No. 3,505,905 (LEPELLETIER) there is provision for giving the transmission system a multiple ratio reverse running condition by providing the main gearbox with a special control device adapted to provide it with a reverse running range.

There is no doubt that an arrangement of this kind has the advantage of giving the transmssion system a multiple ratio reverse running range in the form of a sequence of ratios exactly proportional to the corresponding ratios in forward running.

However, experience has shown that a multiplicity of ratios of this kind given in reverse running generally has advantages only in certain special applications, and that in everyday applications the ratios thus obtained are generally too high by 20 to 40%. It is then necessary to commensurately shorten the final drive ratio to maintain the maximum hill-climbing capacity or tractive power of the vehicle in reverse running.

One is then obliged to use only part of the remarkably extended range of torque and speed values achieved in forward running, whereas it is essential if the best performance is to be achieved that this range retains its full value.

An object of the present invention is a transmission system, especially for automobile vehicles, of the type indicated hereinabove which benefits from a desirable facility of this kind, with a further increased range of torque and speed values in forward running, whilst offering an extremely favorable range of gear ratios in forward running, excellent reverse running and particularly simple control conditions, combined with excellent efficiency.

In accordance with the invention, a transmission system of the above mentioned type, for automobile vehicles in particular, is characterized in that the input gearbox has a reverse gear so that the transmission system has, on the one hand, a reverse gear ratio when the main gearbox is in the slow range and, on the other hand, a top forward gear ratio when the main gearbox is in the fast range.

By virtue of this arrangement, reverse running is obtained not by means of the main gearbox, but instead by means of the input gearbox, which makes it possible to give the transmission not only excellent reverse running with a gearing down ratio of the same order as that of first gear, restoring the benefit of the broad range of torque and speed values of forward running, but also a supplementary and higher forward running ratio with the effect of still further increasing the range of torque and speed values of the transmission system for forward running.

In a preferred embodiment the input gearbox features, as in U.S. Pat. No. 3,505,905 (LEPELLETIER), a braked neutral setting in which the intermediate shaft is decoupled from the input shaft and immobilized, which gives the transmission system a braked neutral setting when the main gearbox is in the slow range and a supplementary high forward running ratio, hereinafter referred to as the penultimate ratio, when the main gearbox is in the fast range.

The advantage of a braked neutral setting is to permit immobilization of the vehicle with its motor running, particularly useful in the case of heavy goods vehicles during momentary stops due to traffic. Regulations and safety considerations make it mandatory for the heavy goods vehicle driver to engage and then disengage the parking brake each time the vehicle is stopped and restarted.

The provision of a braked neutral setting of this kind thus offers the considerable benefit of freeing the driver of the need to carry out this particularly tiresome maneuver.

The provision of a penultimate forward running ratio beneficially introduces an intermediate step between the fast mode ratios and the abovementioned ultimate forward running ratio, which makes it possible to achieve a regular and progressive distribution of ratios whilst retaining the increased range of torque and speed values which favor operation.

In one embodiment, the double planet gear of the main gearbox comprises first and second main gearbox elementary planetary gear trains each having three elements: a planet wheel, a ring gear and a satellite carrier the satellites of which mesh with the planet wheel and with the ring gear, the first element of the main gearbox being formed by the twinned planet wheels of the first and second trains coupled to the intermediate shaft, the second element of the main gearbox being formed by the satellite carrier of the second train and cooperating with the clutch mentioned above, the third element of the main gearbox being formed by the twinned satellite carrier of the first train and ring gear of the second train coupled to the output shaft, and the fourth element of the main gearbox being formed by the ring gear of the first train and cooperating with the brake mentioned above.

An arrangement of this kind provides for a rugged construction and trouble-free operation with excellent efficiency.

In a preferred embodiment, the input gearbox comprises first and second planetary gear trains each having three elements comprising a planet wheel, a ring gear and a satellite carrier the satellites of which mesh with the planet wheel and with the ring gear, a first element of the first train of the input gearbox being selectively, by the input gearbox control means, engaged with the input shaft or immobilized or free, a first element of the second train of the input gearbox being coupled to the intermediate shaft, the two second elements of the two input gearbox trains being twinned and selectively, by the input gearbox control means, engaged with the input shaft or immobilized or free, whereas the two third elements of the two input gearbox trains are twinned and selectively, by the input gearbox control means, immobilized or free. Thus the input gearbox has a configuration which is analogous to that of the main gearbox and the combination of the main gearbox and the input gearbox consists overall of four elementary planetary gear trains disposed side by side, with rugged construction, reduced overall dimensions and excellent efficiency.

Furthermore, according to another variation on the invention, means providing supplementary gearing down are associated with the main gearbox to give the transmission system supplementary ratios in addition to the previously existing ratios which considerably increases the field of possibilities by providing for the optional use of all or some of the previously existing and supplementary ratios, and beneficially procuring in all cases an extra-slow first gear and an extra-slow reverse gear, with gearing down ratios that are increased but still of the same order of magnitude.

By virtue of this arrangement the transmission system has a significantly increased range of torque and speed values for forward running and reverse running, which further widens its field of application and even goes so far as to render unnecessary the use of hydraulic torque converters or complementary amplificiation devices, such as relays or double differential rear axles, for example.

Embodiments of the invention are described hereinafter by way of example and with reference to the accompaniyny drawings, in which.

Figure 2:
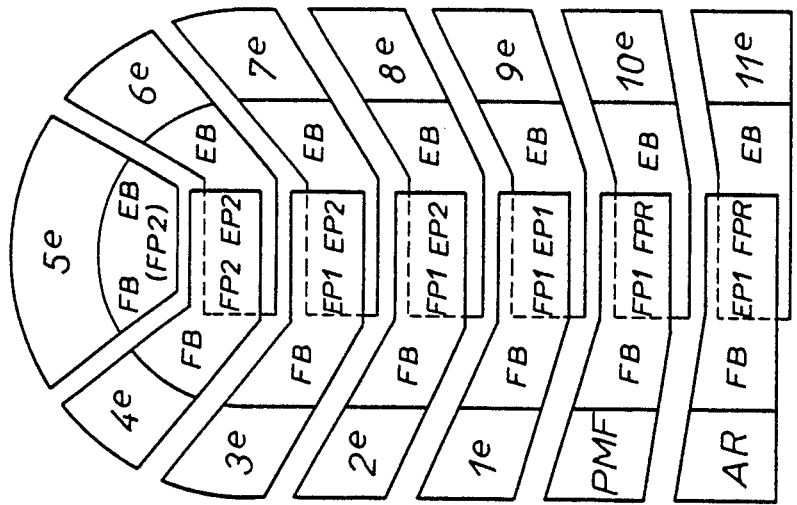
FIG. 2 illustrates the conditions for obtaining the ratios of this transmission system.

In the following description an elementary train of single gears will be referred to as a single train and an elementary train of staggered gears will be referred to as a staggered train.

Reference will first be made to FIGS. 1 through 4 which concern, by way of non-limiting example, an application of the invention to a transmission system for heavy goods vehicles.

The transmission system comprises (FIG. 1) an input gearbox P and a main gearbox B disposed between an input shaft E and an output shaft S. The input gearbox P and the main gearbox B are interconnected by an intermediate shaft M.

The input gearbox P has a free neutral setting in which the intermediate shaft M is decoupled from the input shaft E and is freely rotatable, a sequence of forward running ratios in which the intermediate shaft M is coupled to the input shaft E with a variable forward running ratio and a reverse running ratio in which the intermediate shaft M is coupled to the input shaft E with a reverse running ratio.

The input gearbox comprises input gearbox control means EP1, EP2, FP1, FP2, FPR by means of which the input gearbox P is selectively placed in the free neutral setting or in a forward running gear with a ratio selected from said sequence of ratios or in reverse running gear with said reverse running ratio.

The main gearbox B comprises a double planetary gear with four elements L1, L2, L3 and L4. The first element L1 is coupled to the intermediate shaft M. The second element L2 is associated with a clutch EB by means of which the second element L2 is selectively coupled to the input shaft E or released. The third element L3 is coupled to the output shaft S. The fourth element L4 is associated with a brake FB by means of which the fourth element L4 is selectively immobilized or released.

The main gearbox B has a slow forward running range, an intermediate forward running range and a fast forward running range.

The slow forward running range is obtained when the second element L2 is freed by disengaging the clutch EB and the fourth element L4 is immobilized by engaging the brake FB.

The intermediate forward running range is obtained when the second element L2 is coupled to the input shaft E by engaging the clutch EB and the fourth element L4 is immobilized by engaging the brake FB.

The fast forward running range is obtained when the second element L2 is coupled to the input shaft E by engaging the clutch EB and the fourth element L4 is freed by disengaging the brake FB.

The transmission system P-B has a slow forward running mode, an intermediate forward running mode and a fast forward running mode.

The slow forward running mode is obtained when the input gearbox P is in a forward gear ratio and the main gearbox B is in the slow forward running range.

The intermediate forward running mode is obtained when the input gearbox P is in the free neutral setting and the main gearbox B is in the intermediate forward running range.

The fast forward running mode is obtained when the input gearbox P is in the forward running range and the main gearbox B is in the fast forward running range.

A variation of ratio in the sequence of forward running ratios of the input gearbox P varies the transmission system's slow forward running mode ratio in the same sense and the transmission system's fast forward running mode ratio in the opposite sense.

The input gearbox P also has a braked neutral setting obtained selectively by the control means EP1, EP2, FP1, FP2, FPR in which the intermediate shaft M is decoupled from the input shaft E and immobilized.

The effect of this arrangement is to give the transmission system P-B a braked neutral setting in which the output shaft S is immobilized when the main gearbox B is in the slow range and a high forward running ratio, called the penultimate ratio for reasons which will emerge later, when the main gearbox B is in the fast range.

The input gearbox P also has a reverse ratio which is selectively obtained by the input gearbox control means EP1, EP2, FP1, FP2, FPR and which gives the transmission system P-B a reverse gear when the main gearbox B is in the slow range and a supplementary forward running ratio, designated the ultimate ratio since it lies above the penultimate ratio, itself situated above the fast forward running mode ratios. This ultimate forward running ratio is obtained when the main gearbox B is in the fast range.

In the example shown in FIGS. 1 through 4, the input gearbox P has one reverse gear, a braked neutral setting and four forward gears.

Under these conditions, the transmission system P-B has (FIG. 2) a reverse gear AR, a braked neutral setting PMF and eleven forward gears designated first second, third, fourth, fifth, sixth, seventh, eigth, ninth, tenth and eleventh.

FIG. 2 shows how these various ratios are obtained. There are indicated in FIG. 2 the input gearbox control means EP1, EP2, FP1, FP2 and FPR and also the clutch EB and the brake FB. The presence of the letters designating these various clutches and brakes in FIG. 2 indicates that they are engaged while their absence indicates that they are disengaged.

It will be seen that the first through fourth forward running ratios correspond to the slow mode, whereas the fifth forward running ratio is the intermediate one. The sixth to ninth forward running ratios correspond to the fast forward running mode. The tenth ratio corresponds to the braked neutral setting and is the penultimate ratio and the eleventh ratio corresponds to reverse running and is the ultimate ratio. With this distribution of the various forward running ratios, from the first up to the eleventh, there is obtained an extremely wide range of torque and speed values for both forward running and reverse running, which is favorable to the operation of heavy goods vehicles in particular.

FIG. 2 also shows that to change from one ratio to the next, or to skip a ratio, if necessary, not more than two of the control components are ever used. For example, in order to change from second to third, it is seen that the clutch EP2 and the brake FB remain engaged while the clutch EP1 and the brake FP1 are changed over, with respect to their engagement and disengagement. The same applies to all other changes of ratio, including at the position of the intermediate ratio, that is to say the fifth ratio, where it is sufficient for example to leave the brake FP2 engaged so as not to have to change over more than two control components, in this instance the brake FB and the clutch EB. It will be noted that in order to obtain this fifth forward running or intermediate ratio it would be immaterial whether the brake FP2 were engaged or disengaged and this is the reason why the designation FP2 is in parentheses in FIG. 2.

In the example shown in FIGS. 1 through 4, the double planetary gear of the main gearbox B comprises first and second planetary gear trains TB1 and TB2.

Each planetary gear train TB1 or TB2 has three members generally designated X, Y and Z, comprising a planet wheel member 10, a ring gear member 11 and a satellite carrier member 12 the satellites 13 of which mesh with the planet wheel member 10 and the ring gear member 11.

Figure 3:
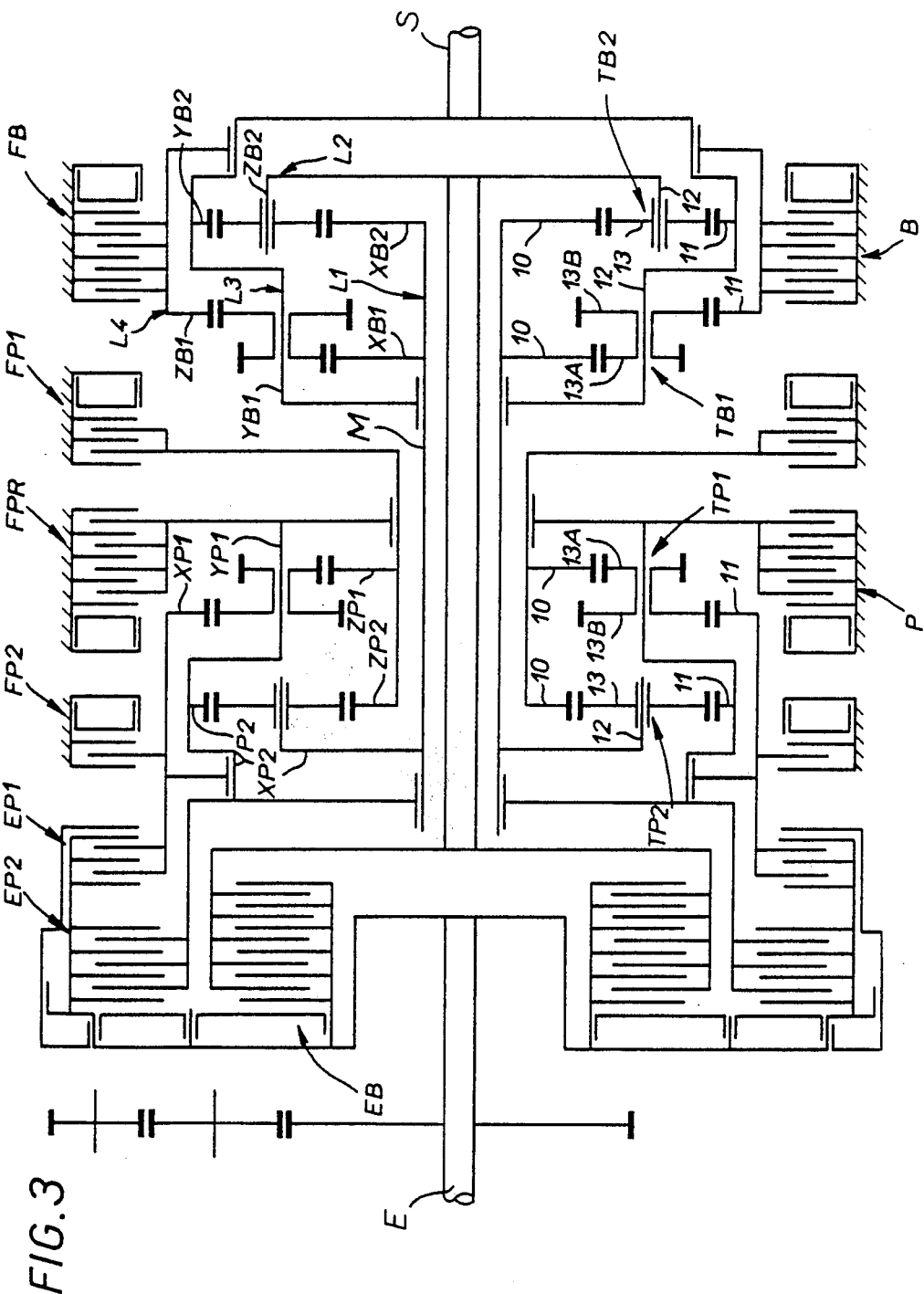
FIG. 3 shows one embodiment of the transmission system of FIG. 1.

It should be noted that the satellites may be either single, in which case they are designated 13, or staggered, in which case they are designated 13A and 13B, as seen in FIG. 3. These satellites 13A and 13B are fastened together and have different numbers of teeth and/or diameters. One of them meshes with a planet wheel and the other with a ring gear.

The first element L1 of the main gearbox B is formed by a first member XB1 of the first train TB1 and a first member XB2 of the second train TB2 which are twinned and coupled to the intermediate shaft M.

The members XB1 and XB2 are both planet wheels 10.

The second element L2 of the main gearbox B is formed by a second member ZB2 of the second train TB2. This second element L2 is not twinned and cooperates with the clutch EB.

The member ZB2 is a satellite carrier L2.

The third element L3 of the main gearbox B is formed by a second member YB1 of the first train TB1 and a third member YB2 of the second train TB2, which are twinned and coupled to the output shaft S.

The member YB1 is a satellite carrier 12 and the member YB2 is a ring gear 11.

The fourth element L4 of the main gearbox B is formed by the third member ZB1 of the first train TB1.

This fourth element L4 is not twinned and cooperates with the brake FB.

The member ZB1 is formed by a ring gear 11.

In the example shown in FIGS. 1 through 4, the input gearbox P comprises a first input gearbox planetary gear train TP1 and a second input gearbox planetary gear train TP2.

Each elementary input gearbox planetary gear train comprises three members X, Y, Z including a planet wheel member 10, a ring gear member 11 and a satellite carrier member 12 the satellites 13 of which mesh with the planet wheel member 10 and the ring gear member 11. The satellites may be single (designated by 13) or staggered and consist of two satellites 13A and 13B. These satellites 13A and 13B are fastened together and have different numbers of teeth and/or diameters. One of them meshes with a planet wheel member and the other with a ring gear member.

A first member XP1 of the first input gearbox train TP1 is not twinned and cooperates with the clutch EP1 and the brake FP2. The member XP1 is thus able, by virtue of the interplay of the clutch EP1 and the brake FP2, to be selectively engaged with the input shaft E by the clutch or immobilized or free.

In the example of FIG. 3, the member XP1 is a ring gear member 11.

A first member XP2 of the second input gearbox train TP2 is coupled to the intermediate shaft M.

The member XP2 is a satellite carrier member 12.

The two second members YP1 and YP2 of the two input gearbox trains TP1 and TP2 are twinned and cooperate with the clutch EP2 and the brake FPR.

The combination of YP1 and YP2 is thus able, by virtue of the interplay of the clutch EP2 and the brake FPR, to be selectively engaged with the input shaft E by the clutch or immobilized or free.

The member YP1 is a satellite carrier member 12 and the member YP2 is a ring gear member 11.

The two third members ZP1 and ZP2 of the two input gearbox trains TP1 and TP2 are twinned and cooperate with the brake FP1. Thus this combination is able, by virtue of the brake FP1, to be selectively immobilized or free.

The members ZP1 and ZP2 are planet wheels 10.

Figure 1:
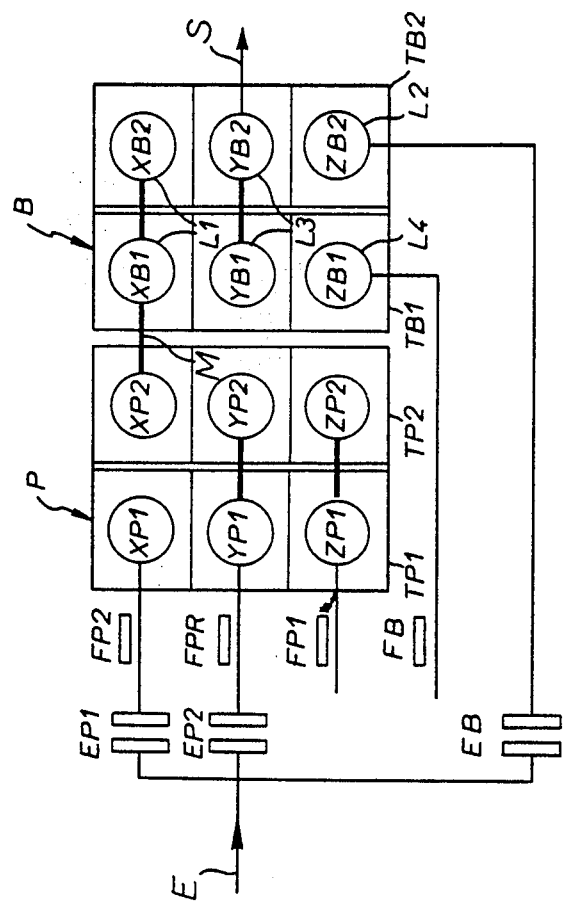
FIG. 1 shows schematically a transmission system in accordance with the invention together with its control means, this transmission system having eleven forward running gears, a braked neutral setting and a reverse gear.

It will be seen in FIGS. 1 and 3 that the planet gear trains TP1, TP2, TB1 and TB2 of the input gearbox P and of the main gearbox B are all four placed alongside one another in the order second input gearbox train TP2, first input gearbox train TP1, first main gearbox train TB1 and second main gearbox train TB2. These various gear trains are of similar construction, which is particularly rugged. The combination of these gear trains features reduced overall dimensions and excellent efficiency.

In the non-limiting example shown in FIG. 3, the satellites of the train TP1 are staggered and comprise a satellite 13A meshing with the planet wheel 10 and a satellite 13B meshing with the ring gear 11. The satellites of the train TP2 are single and designated 13. They mesh with the planet wheel 10 and with the ring gear 11. The satellites of the train TB1 are staggered and comprise satellites 13A meshing with the planet wheel 10 and satellites 13B meshing with the ring gear 11, whereas the satellites of the train TB2 are single and designated 13. They mesh with the planet wheel 10 and with the ring gear 11. In the example shown in FIG. 3, the numbers of teeth are as follows:

| First input gearbox train TP1 | |
|---|---|
| planet wheel 10 (XP1) | 47 |
| satellites 13A (of YP1) | 16 |
| satellites 13B (of YP1) | 24 |
| ring gear 11 (ZP1) | 81 |
| Second input gearbox train TP2 | |
| planet wheel 10 (ZP2) | 33 |
| satellites 13 (of YP2) | 24 |
| ring gear 11 (YP2) | 81 |
| First main gearbox train TB1 | |
| planet wheel 10 (XB1) | 48 |
| satellites 13A (of YB1) | 18 |
| satellites 13B (of YB1) | 25 |
| ring gear 11 (ZB1) | 89 |
| Second main gearbox train TB2 | |
| planet wheel 10 (XB2) | 46 |
| satellites 13 (of ZB2) | 21 |
| ring gear 11 (YB2) | 89 |

Figure 4:
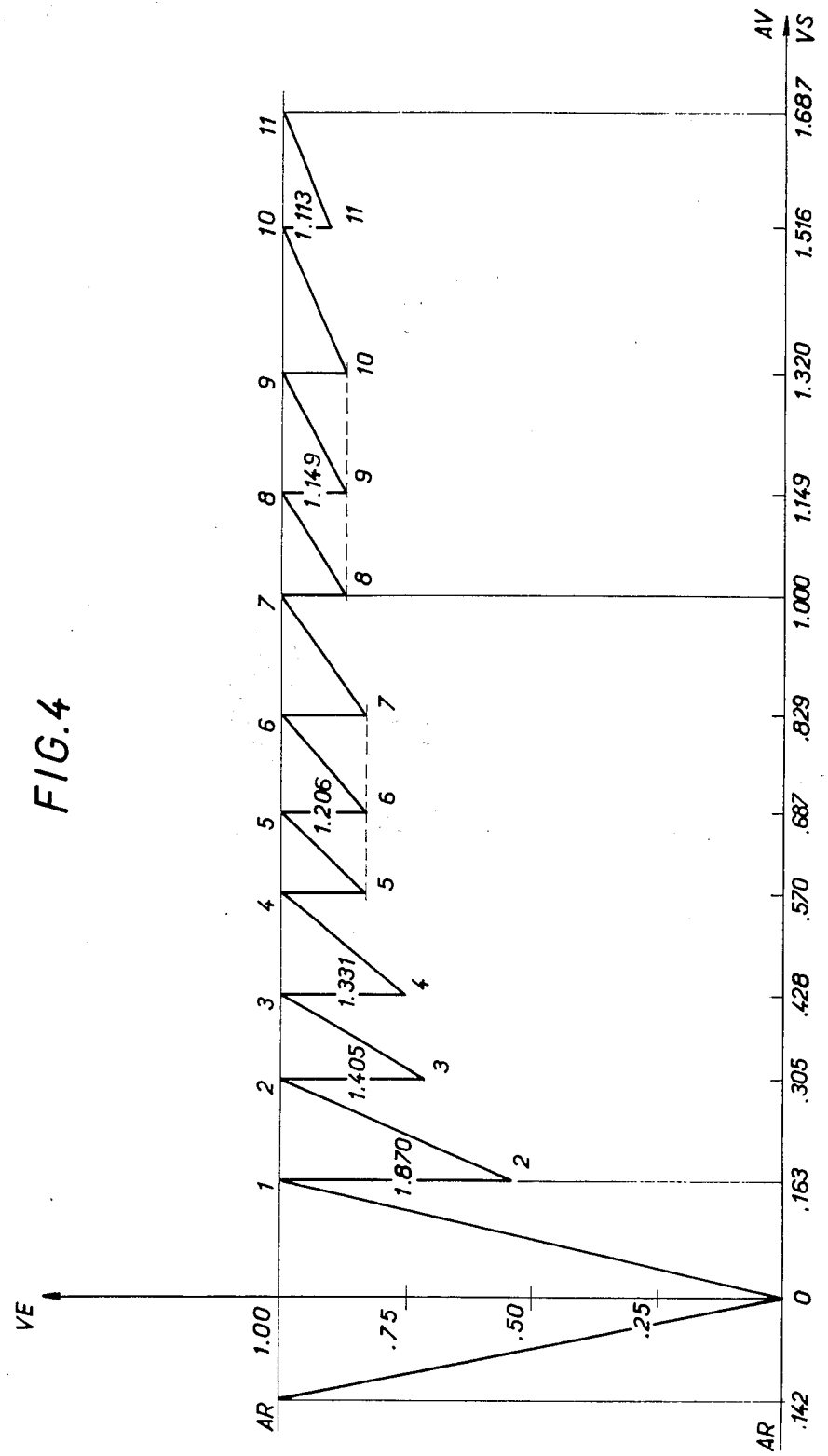
FIG. 4 is a diagram showing the variations in the output speed VS of the transmission system of FIG. 3 plotted on the horizontal axis as a function of the input speed VE plotted on the vertical axis.

With an arrangement such as this, and as is seen in the diagram of FIG. 4, a remarkable progressive sequence of ratios is obtained.

These ratios are as follows:

| | |
|---|---|
| Reverse gear | 0.142 |
| First forward gear | 0.163 |
| Second forward gear | 0.305 |
| Third forward gear | 0.428 |
| Fourth forward gear | 0.570 |
| Fifth (intermediate) forward gear | 0.687 |
| Sixth forward gear | 0.829 |
| Seventh forward gear (direct drive) | 1.000 |
| Eighth forward gear | 1.149 |
| Ninth forward gear | 1.320 |
| Tenth forward gear (penultimate ratio) | 1.516 |
| Eleventh forward gear (ultimate ratio) | 1.687 |

It will be appreciated that the range of torque and speed values is very wide, reaching 10.35 for forward running and 11.90 for reverse running, which is especially favorable to the operation of heavy goods vehicles in particular.

The steps between ratios, as can be seen in the diagram of FIG. 4, are in accordance with a no less remarkable progression, as follows:

| | |
|---|---|
| between first and second forward gears | 1.870 |
| between second and third forward gears | 1.405 |
| between third and fourth forward gears | 1.331 |
| between fourth and fifth forward gears | 1.206 |
| between fifth and sixth forward gears | 1.206 |
| between sixth and seventh forward gears | 1.206 |
| between seventh and eigth forward gears | 1.149 |
| between eigth and ninth forward gears | 1.149 |
| between ninth and tenth forward gears | 1.149 |
| between tenth and eleventh forward gears | 1.113 |

It will also be noted that the arrangement in accordance with the invention makes it possible to achieve series such as that shown in FIG. 4 but also all other sorts of series of the widest diversity, in particular entirely arithmetic series or geometric series incorporating steps in the staggering of the ratios featuring successive plateaus, and generally speaking series which can be easily adapted to suit any application.

It will be appreciated from FIG. 3 that in the transmission system in accordance with the invention the input shaft E, the input gearbox P, the intermediate shaft M, the main gearbox B and the output shaft S are coaxial. It will also be understood that the seventh ratio is then a direct drive ratio.

An alternative arrangement (FIG. 5) is analogous to that which has just been described with reference to FIGS. 1 through 4, but the first member XP1 of the first input gearbox train TP1 is a planet wheel member 10, the first member XP2 of the second input gearbox train TP2 is a satellite carrier member 12, the second member YP1 of the first input gearbox train TP1 is a satellite carrier member 13, the second member YP2 of the second input gearbox train TP2 is a ring gear member 11, the third member ZP1 of the first input gearbox train TP1 is a ring gear member 11 and the third member ZP2 of the second input gearbox train TP2 is a planet wheel member 10.

Excellent conditions in respect of construction and operation are also obtained with an arrangement of this kind.

Figure 5:
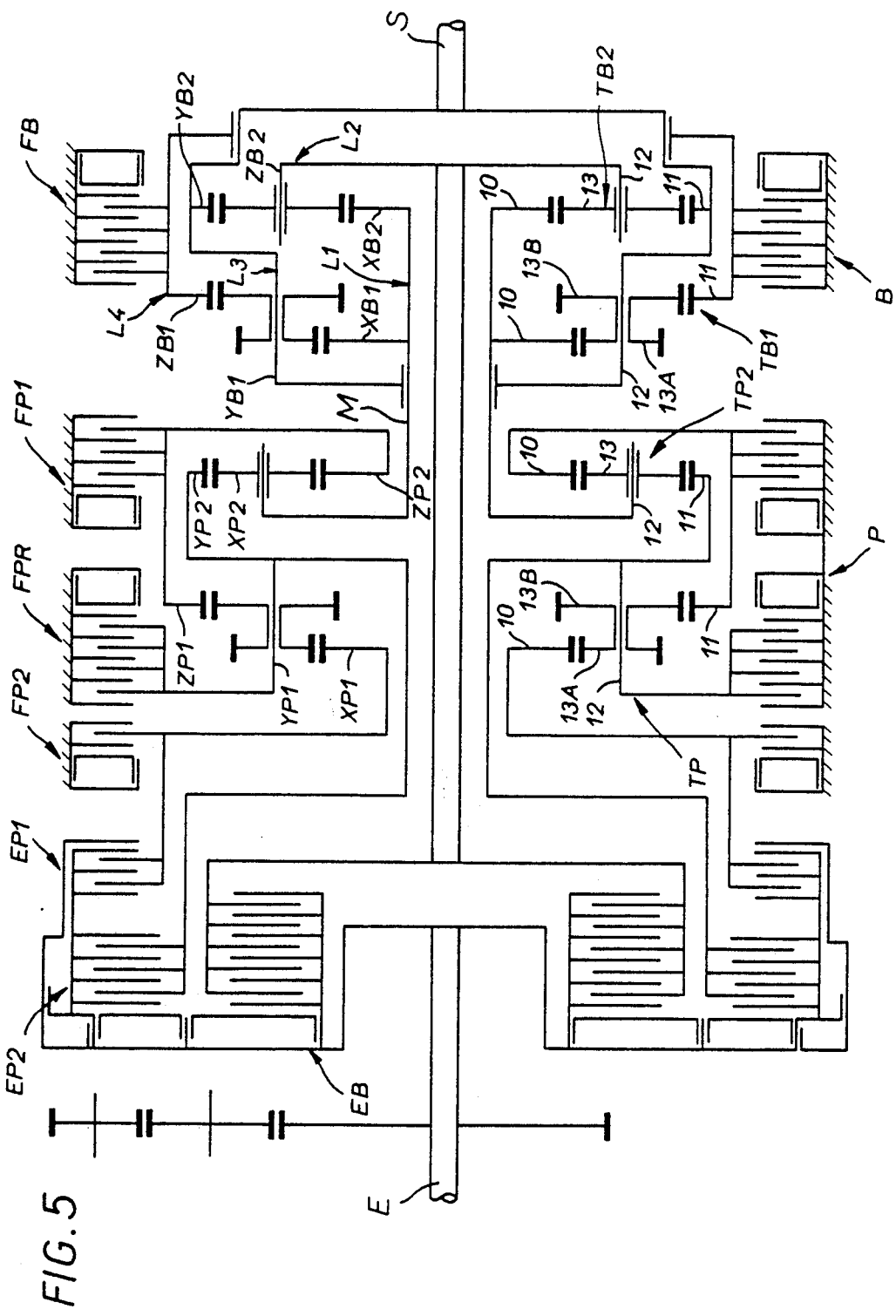
FIG. 5 is a view analogous to FIG. 3, but concerning an alternative embodiment.

It will be noted in FIG. 5 that the planetary gear trains of the input gearbox P and of the main gearbox B are all four placed alongside one other, in the following order: first input gearbox train TP1, second input gearbox train TP2, first main gearbox train TB1 and second main gearbox train TB2.

In another alternative arrangement (FIGS. 6 and 7), the layout is analogous to those previously described, but a gearing down planet gear train TL is associated with the main gearbox B to give the transmission system supplementary ratios for both forward running and reverse running.

Figure 6:
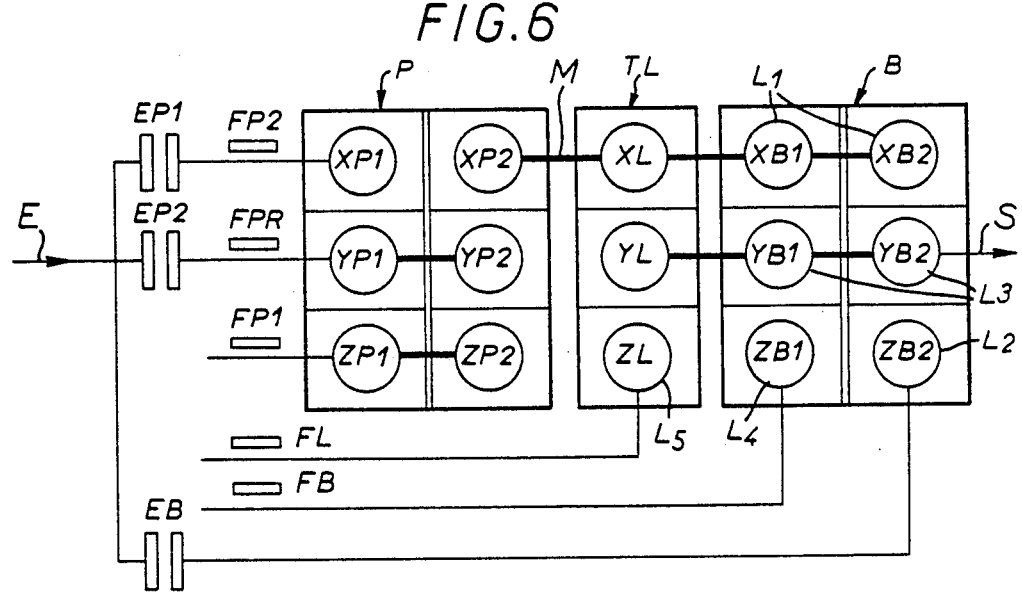
FIG. 6 is a view analogous to FIG. 1, but concerning an alternative embodiment in which a gearing down planetary gear train is associated with the main gearbox to give the transmission system supplementary ratios in addition to the previously existing ratios, in particular an extra-slow first gear and an extra-slow reverse gear.
Figure 7:
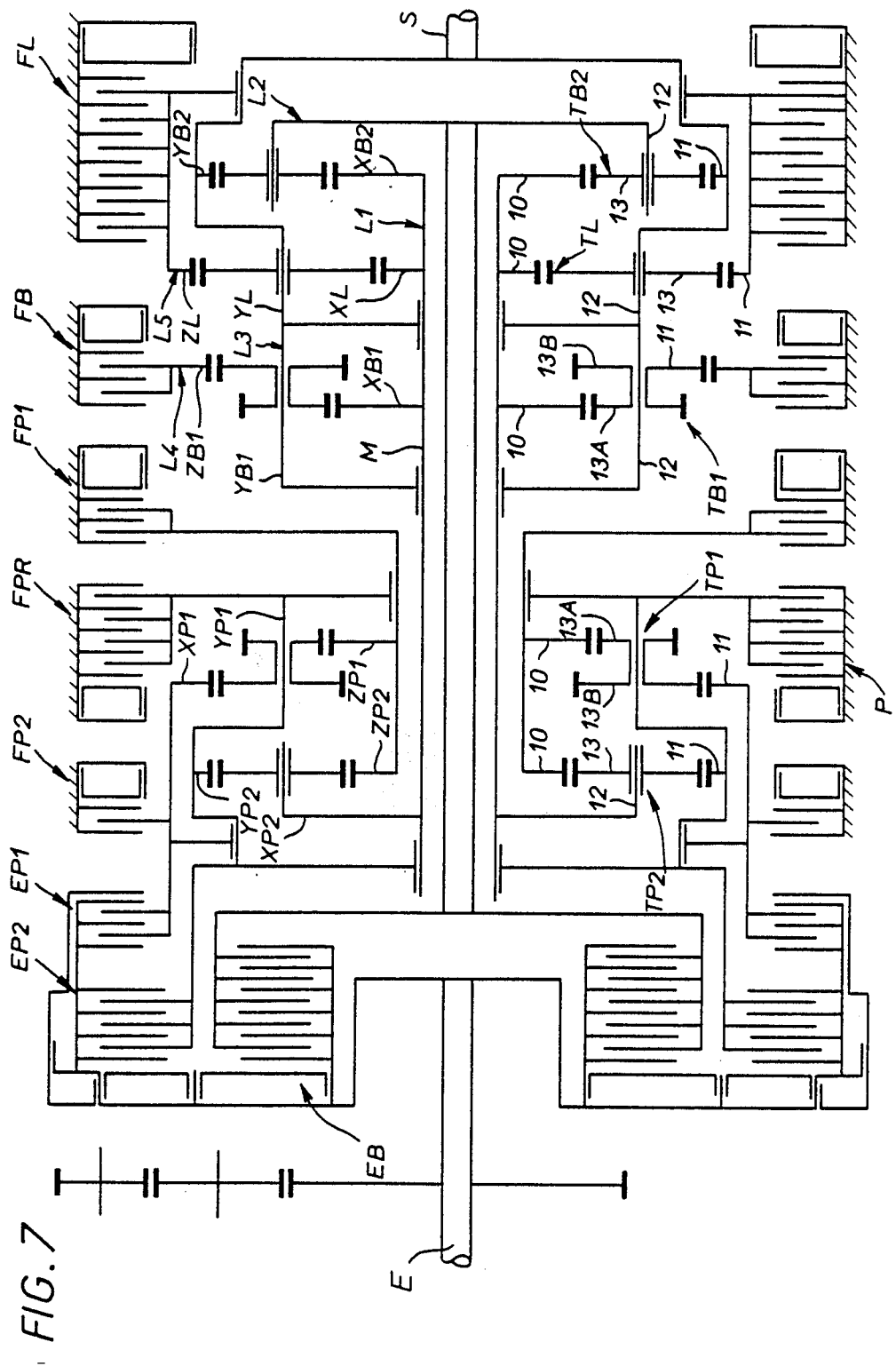
FIG. 7 shows one embodiment of the transmission system of FIG. 6.

Specifically, in the transmission system of FIGS. 6 and 7, the arrangement comprises in precisely the same way the same input gearbox P whereas the main gearbox B comprises the same double planet gear with four elements L1, L2, L3, L4 augmented by an elementary train TL with three members to constitute a new triplicated assembly with five elements L1, L2, L3, L4, L5 and a brake FL by means of which the fifth element L5 of this new assembly is selectively immobilized or released. Specifically, the elementary train TL comprises a planet wheel XL twinned with XP2, XB1 and XB2, a satellite carrier YL twinned with YB1 and YB2, and a ring gear ZL constituting the fifth element cooperating at will with the brake FL.

The main gearbox thus features a fourth forward running range, called extra-slow in the sense that it is deliberately geared down relative to the slow range, so that the transmission system features a fourth forward running operating mode, called extra-slow, in which the input gearbox P is in a forward gear ratio and the main gearbox B in the extra-slow range, and a second reverse gear in which the input gearbox P is in a reverse gear ratio and the main gearbox B is in the extra-slow range.

Under these conditions, the transmission system P-B features the following supplementary ratios: an under-reverse or extra-slow reverse running gear LAR, a second braked neutral setting PMFL obtained by engaging the brake FL instead of the brake FB, an extra-slow first gear or under-first gear L1st, an under-second gear L2nd, an under-third gear L3rd and an under-fourth gear L4th, totalling two reverse ratios, two braked neutral settings and fifteen forward ratios.

In one embodiment (FIG. 7) the ratio between the slow and extra-slow modes is preferably chosen to have a value intermediate those for the first/second and second/third steps already existing. The ratios of the first gear, the under-third gear and the under-fourth gear are preferably dispensed with and the transmission system is operated with a range of twelve forward ratios and two reverse ratios which are optimally distributed.

In the example shown in FIG. 7, the gearing down planet gear train TL is accommodated between the first main gearbox train TB1 and the second main gearbox train TB2. The first member XL of the train TL is a planet wheel 10 with thirty-two teeth. The second member YL of the train TL is a satellite carrier 12 the satellites 13 of which each have thirty-one teeth. The third member ZL of the train TL is a ring gear 11 having ninety-four teeth.

Under these conditions, and with identical numbers of teeth, as described for example with reference to FIG. 3 for the various members of the input gearbox P and the main gearbox B, the ratios and the steps between ratios are as follows:

| | | |
|---|---|---|
| Extra-slow reverse gear LAR | 0.084 | } 1.686* |
| Normal reverse gear | 0.142 | |
| Extra-slow 1st gear L1st | 0.097 | } 1.870 |
| Under-2nd gear L2nd | 0.181 | } 1.686* |
| Normal 2nd gear | 0.305 | } 1.405 |
| Normal 3rd gear | 0.428 | } 1.331 |
| Normal 4th gear | 0.570 | } 1.206 |
| Normal 5th (intermediate) gear | 0.687 | } 1.206 |
| Normal 6th gear | 0.829 | } 1.206 |
| Normal 7th gear (direct drive) | 1.000 | } 1.149 |
| Normal 8th gear | 1.149 | } 1.149 |
| Normal 9th gear | 1.320 | } 1.149 |
| Normal 10th gear (penultimate ratio) | 1.516 | } 1.113 |
| Normal 11th gear (ultimate ratio) | 1.687 | |

It will be appreciated that the step of 1.686* integrates perfectly into the pre-existing series and that the range of torque and speed values of the transmission system is increased to 17.47 for forward running and 20.07 for reverse running, which considerably further widens the field of application, rendering totally unnecessary in most cases the use of hydraulic torque converters or complementary amplification devices, such as relays or double differential rear axles, for example.

It will also be appreciated that the change from extra-slow mode to slow mode or vice versa is advantageously effected in a remarkable manner by means of simple control sequences, as in FIGS. 1 through 4.

In another alternative embodiment (FIG. 8), the layout is analogous to that shown in FIG. 6, but the ratio between the slow and extra-slow modes is preferably chosen at a value intermediate the second/third and third/fourth steps already existing. The ratios of first gear, second gear and under-fourth gear are advantageously dispensed with and the transmission system is operated with a range of twelve forward gears and two reverse gears also optimally distributed.

Figure 8:
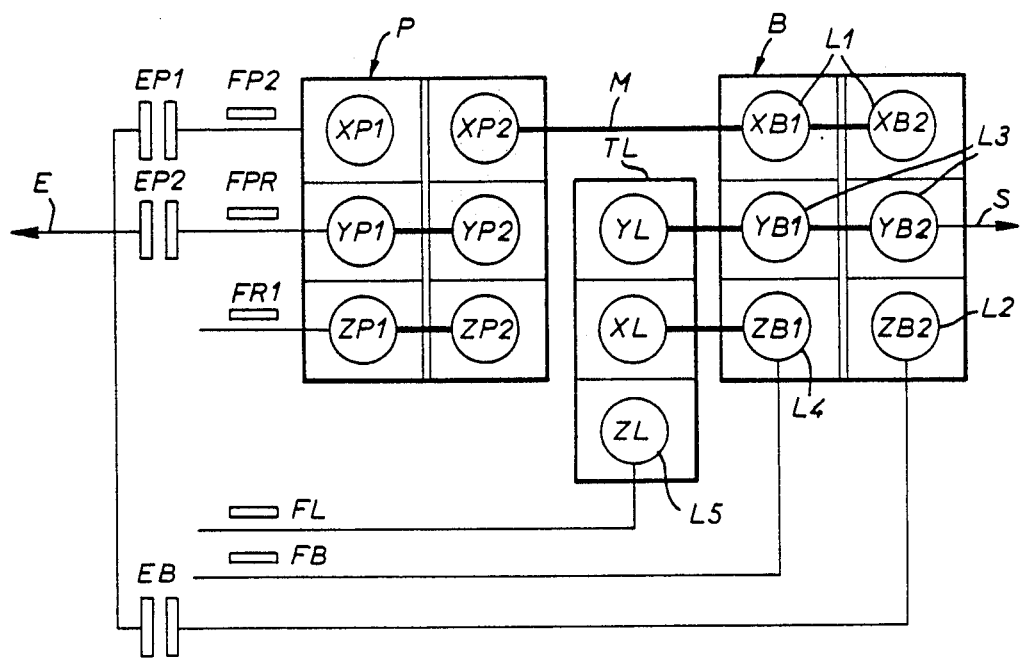
FIG. 8 is analogous to FIG. 6 but concerns an alternative embodiment.

In FIG. 8, XL is twinned with ZB1 and YL is twinned with YB1 and YB2. Z1 still forms the the fifth member L5 cooperating at will with the brake FL.

In FIG. 8, as in FIG. 6, the change from extra-slow mode to slow mode or vice versa is advantageously effected in a remarkable manner by means of simple control sequences.

Alternatively, for certain implementations it may be beneficial to replace the staggered train TB1 of the main gearbox by two single trains.

Figure 9:
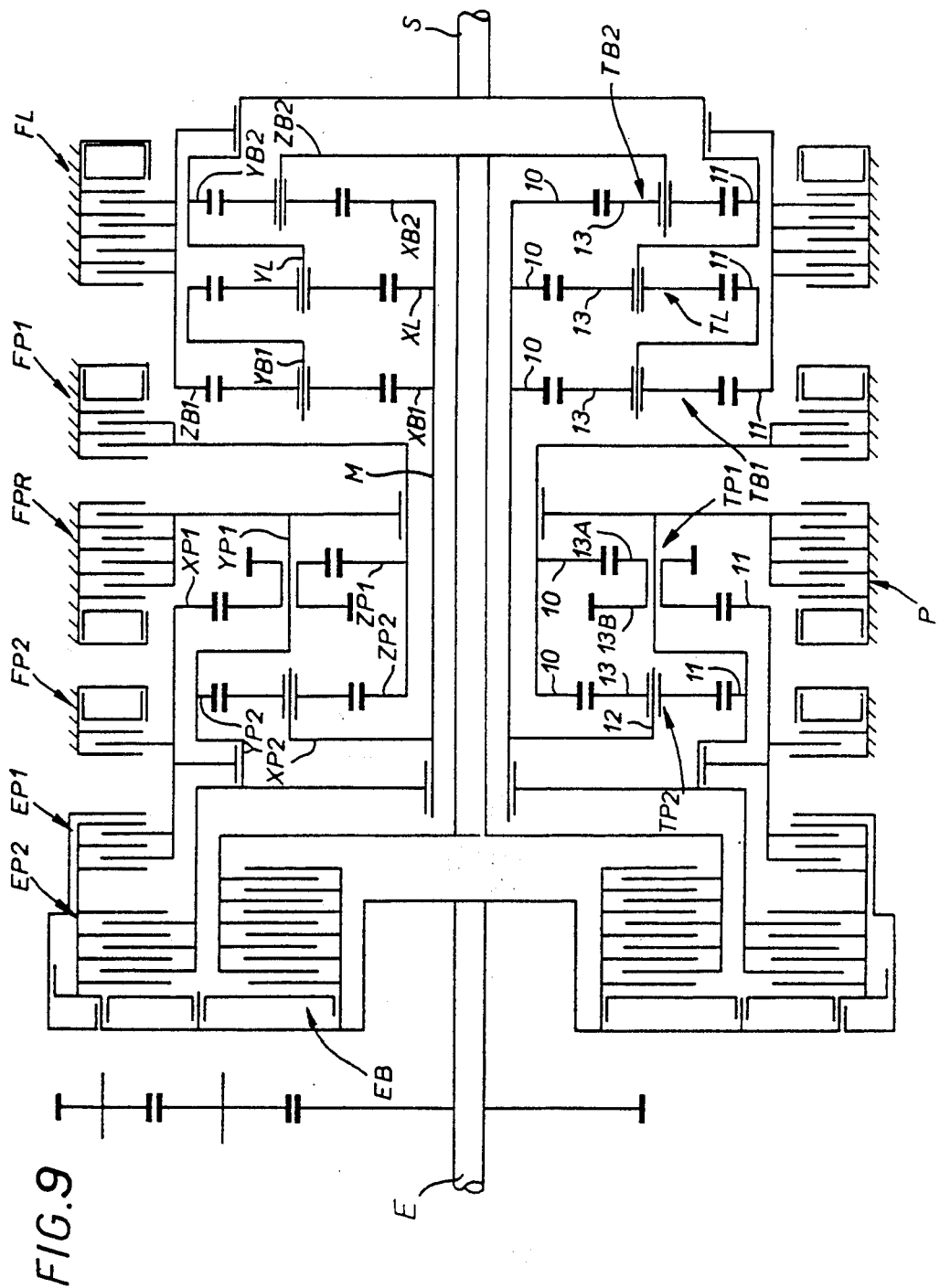
FIGS. 9 and 10 are variations on FIGS. 3 and 7, respectively.
Figure 10:
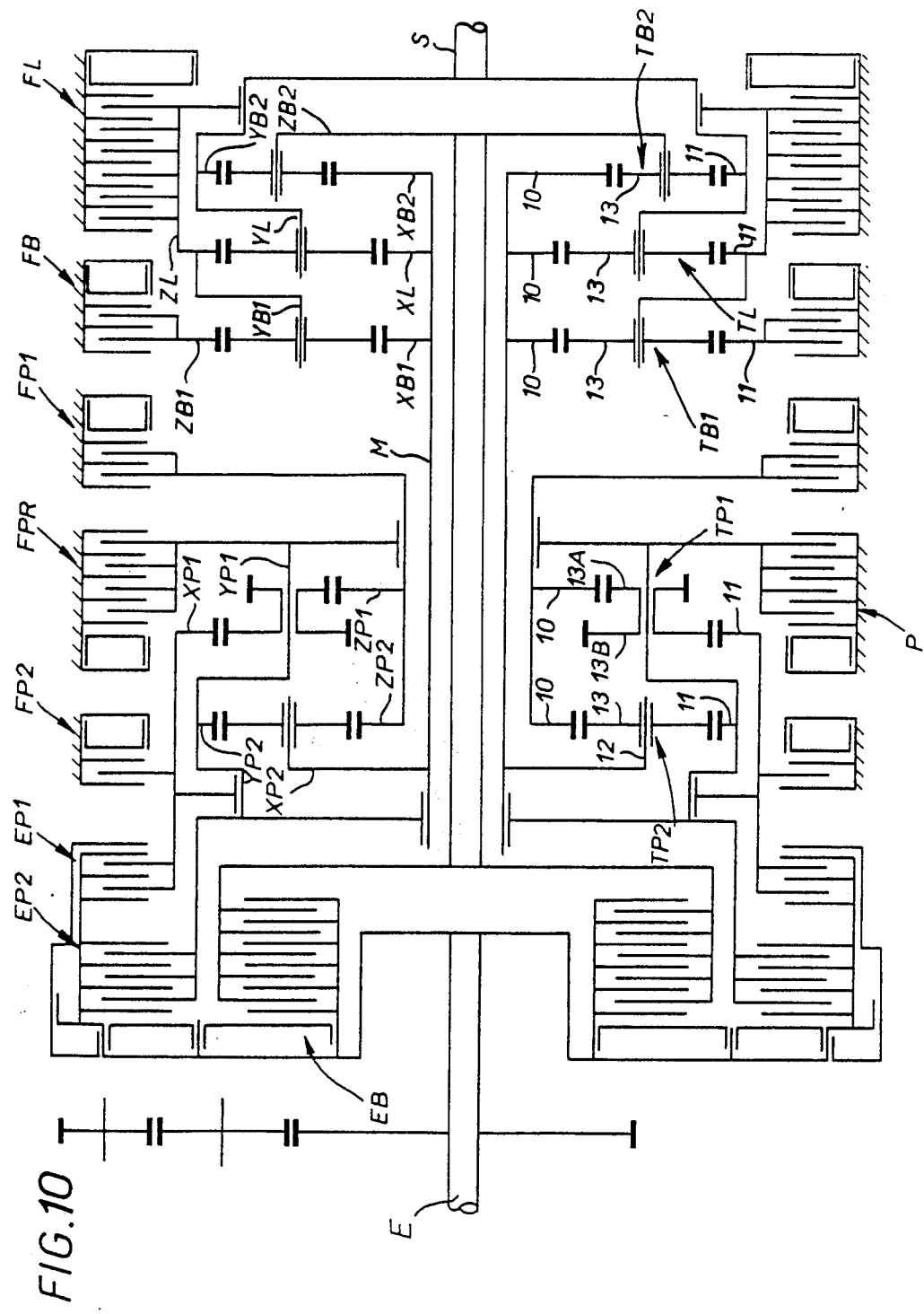

FIGS. 9 and 10 show this variation respectively on the arrangements of FIGS. 3 (eleven forward ratios, one reverse ratio) and 7 (twelve forward ratios, two reverse ratios). The main and input gearbox control means, brakes and clutches and the structure of the input gearbox gearing remain unchanged.

FIG. 9 shows that when this modification is applied to the main gearbox of FIG. 3 one of the replacement single trains is similar to the gearing down train TL previously used. The main gearbox thus comprises three single trains TB1, TL, TB2 associated with one another in cascade.

When the same modification is applied to the transmission system of FIG. 7, it is seen that beginning with the trains TB1, TL of this figure it is possible to obtain two new single trains TB1, TL. The main gearbox again comprises three single trains TB1, TL, TB2 associated with one another in cascade.

Note that the gearing structures of the arrangements shown in FIGS. 9 and 10 are identical. Thus a unified gearbox design makes it possible to implement at will either a gearbox with eleven forward ratios and one reverse ratio or with twelve forward ratios and two reverse ratios, simply by omitting or including a brake FL.

Figure 11:
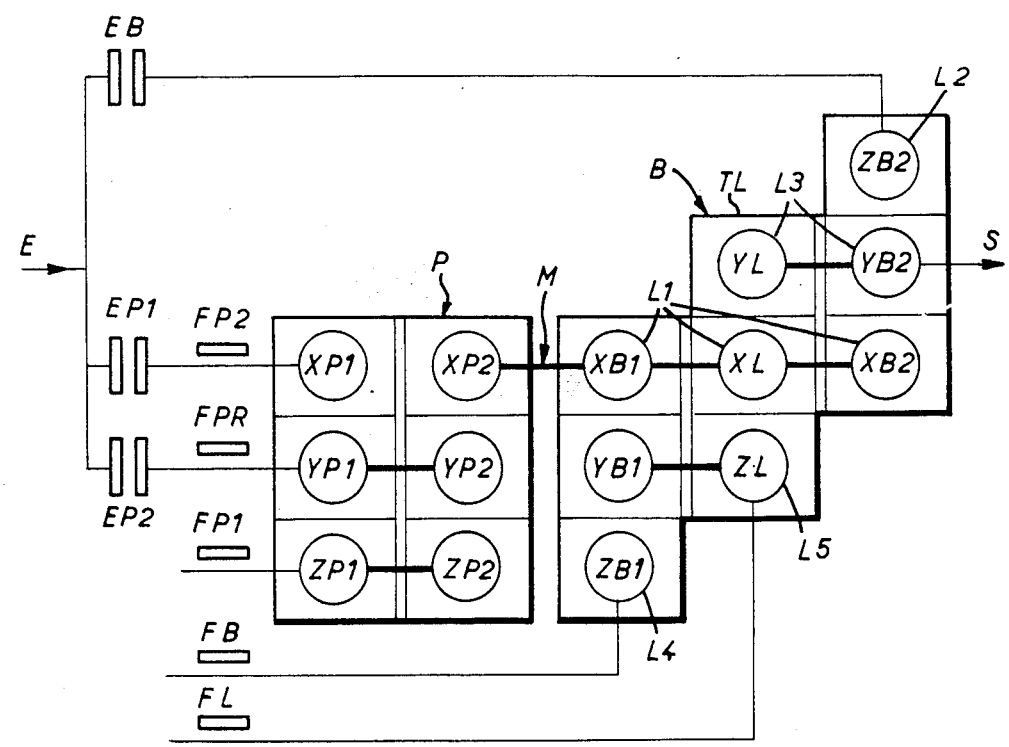
FIG. 11 is analogous to FIGS. 6 and 8, but in relation to the FIG. 10 embodiment.

FIG. 11 represents the coupling of the trains and the control means, using the same symbols as in FIGS. 1, 6 and 8, in the overall arrangement of FIG. 10. It will be noted that FIG. 11 relates to the arrangement of FIG. 9 with the brake FL omitted.

It is to be understood that the invention is not limited to the embodiments described and shown, but encompasses all variations as to implementation within the scope of the claims.

We claim:

1. Transmission system, especially for automobile vehicles, comprising an input shaft (E), an intermediate shaft (M), an output shaft (S), an input gearbox (P) between the input and intermediate shafts and a main gearbox (B) between the intermediate and output shafts, the input gearbox (P) having a free neutral setting in which the intermediate shaft (M) is decoupled from the input shaft (E) and freely rotatable and a sequence of forward gear ratios in which the intermediate shaft (M) is coupled to the input shaft (E) with a variable forward gear ratio, control means for the input gearbox by means of which the input gearbox (P) is selectively placed in its free neutral setting or in a forward gear with a ratio selected from said sequence of ratios, the main gearbox (B) comprising a clutch (EB), a brake (FB), a double planet gear (TB1, TB2) with four elements (L1, L2, L3, L4) of which a first element (L1) is coupled to the intermediate shaft (M), a second element (L2) is selectively coupled to the input shaft (E) or disengaged by the clutch (EB), a third element (L3) is coupled to the output shaft (S) and the fourth element (L4) is selectively immobilized or released by the brake (FB), said main gearbox (B) having three forward running ranges respectively called slow, intermediate and fast such that in its slow range the second element (L2) is released and the fourth elemenent (L4) is immobilized, in its intermediate range the second element (L2) is coupled to the input shaft (E) and the fourth element (L4) is immobilized in its fast range, the second element (L2) is coupled to the input shaft (E) and the fourth element (L4) is released in its fast range, the transmission system (P, B) having three forward running modes: a slow mode in which the input gearbox (P) is in a forward gear and the main gearbox (B) is in its slow range, an intermediate mode in which the input gearbox (P) is in its free neutral setting and the main gearbox (B) is in its intermediate range and a fast mode in which the input gearbox (P) is in a forward gear and the main gearbox (B) is in its fast range, a change of gear ratio within the sequence of forward gear ratios of the input gearbox (P) increasing the slow forward running ratio of the transmission system (P, B) and decreasing the fast forward running ratio of the transmission system (P, B) and vice versa, the transmission system characterized in that the input gearbox (P) has a reverse gear selected by the input gearbox control means (EP1, EP2, FP1, FP2, FPR), which gives the transmission system on the one hand, a reverse ratio (AR) when the main gearbox (B) is in its slow range and, on the other hand, a highest (11th) forward gear ratio of the transmission system when the main gearbox (B) is in its fast range.

2. Transmission system according to claim 1, characterized in that the input gearbox (P) has a braked neutral setting selected by said input gearbox control means (EP1, EP2, FP1, FP2, FPR) whereby the intermediate shaft (M) is decoupled from the input shaft (E) and is immobilized, which gives the transmission system, on the one hand, a braked neutral setting (PMF) when the main gearbox is in its slow range and, on the other hand, a penultimate (10th) forward running gear ratio when the main gearbox is in its fast range.

3. Transmission system according to claim 2, characterized in that the double planet gear of the main gearbox (B) comprises first and second main gearbox single planetary gear trains (TB1, TB2) each having three members (X, Y, Z): a planet wheel (10), a ring gear (11) and a satellite carrier (12) the satellites (13) of which mesh with the planet wheel (10) and with the ring gear (11), the first element (L1) of the main gearbox (B) being formed by the planet wheel (XB1) of the first main gearbox train (TB1) twinned with the planet wheel (XB2) of the second main gearbox train (TB2) and coupled to the intermediate shaft (M), the second element (L2) of the main gearbox (B) being formed by the satellite carrier (ZB2) of the second main gearbox train (TB2) and cooperating with said clutch (EB), the third element (L3) of the main gearbox (B) being formed by the satellite carrier (YB1) of the first main gearbox train (TB1) twinned with the ring gear (YB2) of the second mean gearbox train (TB2) and coupled to the output shaft (S), the fourth element (L4) of the main gearbox (B) being formed by the ring gear (ZB1) of the first main gearbox train (TB1) and cooperating with said brake (FB).

4. Transmission system according to claim 3, characterized in that the input gearbox (P) has a sequence of forward running gear ratios and a reverse running gear ratio and comprises first and second single planetary gear trains (TP1, TP2) each having three members (XYZ) comprising a planet wheel (10), a ring gear (11) and a satellite carrier (12) the satellites (13) of which mesh with the planet wheel (10) and with the ring gear (11), a first member (XP1) of the first input gearbox train (TP1) being selectively, by said input gearbox control means (EP1, EP2, FP1, FP2, FPR), engaged with the input shaft (E) or immobilized or free, a first member (XP2) of the second input gearbox train (TP2) being coupled to the intermediate shaft (M), the two second members (YP1, YP2) of the two input gearbox trains (TP1, TP2) being twinned and selectively, by said input gearbox control means (EP1, EP2, FP1, FP2, FPR), engaged with the input shaft (E) or immobilized or free, whereas the two third members (ZP1, ZP2) of the two input gearbox trains (TP1, TP2) are twinned and selectively, by said input gearbox control means (EP1, EP2, FP1, FP2, FPR), immobilized or free (FIG. 1).

5. Transmission system according to claim 4, characterized in that the first member (XP1) of the first input gearbox train (TP1) is a ring gear (11), the first member (XP2) of the second input gearbox train (TP2) is a satellite carrier (12), the second member (YP1) of the first input gearbox train (TP1) is a satellite carrier (12), the second member (YP2) of the second input gearbox train (TP2) is a ring gear (11), the third member (ZP1) of the first input gearbox train (TP1) is a planet wheel (10) and the third member (ZP2) of the second input gearbox train (TP2) is a planet wheel (10) (FIG. 3).

6. Transmission system according to claim 5, characterized in that the single planet gear trains of the input gearbox (P) and the main gearbox (B) are all four placed one alongside the other, in the order: second input gearbox train (TP2), first input gearbox train (TP1), first main gearbox train (TB1) and second main gearbox train (TB2).

7. Transmission system according to claim 3, characterized in that the input gearbox (P) has a sequence of forward running gear ratios and a reverse running gear ratio and comprises first and second single planetary gear trains (TP1, TP2), a first member (XP1) of the first input gearbox train (TP1) is a planet wheel (10), a first member (XP2) of the second input gearbox train (TP2) is a satellite carrier (12), a second member (YP1) of the first input gearbox train (TP1) is a satellite carrier (12), a second member (YP2) of the second input gearbox train (TP2) is a ring gear (11), a third member (ZP1) of the first input gearbox train (TP1) is a ring gear (11), and a third member (ZP2) of the second input gearbox train (TP2) is a planet wheel (10) (FIG. 5).

8. Transmission system according to claim 7, characterized in that the single planet gear trains of the input gearbox (P) and the main gearbox (B) are all four placed alongside one other, in the order: first input gearbox train (TP1), second input gearbox train (TP2), first main gearbox train (TB1) and second main gearbox train (TB2) (FIG. 5).

9. Transmission system according to claim 8, characterized in that gearing down planet gear means (TL) are associated with the double planet gear (TB1, TB2) of the main gearbox (B) to confer on the latter a supplementary extra-slow range geared down relative to the slow range (FIGS. 6 through 11).

10. Transmission system according to claim 9, characterized in that the gearing down planet gear means (TL) are incorporated into the double planet gear (TB1, TB2) of the main gearbox (B) (FIGS. 9-11)

11. Transmission system according to claim 9, characterized in that in an extra-slow mode geared down relative to the slow mode the input gearbox (P) is in a forward gear ratio and the main gearbox (B) is in the extra-slow range.

12. Transmission system according to claim 9, characterized in that, in a second reverse running ratio, the input gearbox (P) is in the reverse gear ratio and the main gearbox (B) is in the extra-slow range.

13. Transmission system according to claim 1, characterized in that the main gearbox (B) is formed by a triple assembly of cascaded single trains TB1, TL, TB2 (FIGS. 9-11).

14. Transmission system according to claim 1 characterized in that the input shaft (E), the input gearbox (P), the intermediate shaft (M), the main gearbox (B) and the output shaft (S) are coaxial.

15. Transmission system according to claim 1, characterized in that one of the ratios in the fast mode is a direct drive ratio.

16. Transmission system according to claim 1 characterized in that the input gearbox (P) has a sequence of forward running gear ratios and a reverse running gear ratio and comprises first and second single planetary gear trains (TP1, TP2) each having three members (XYZ) comprising a planet wheel (10), a ring gear (11) and a satellite carrier (12), the satellites (13) of which mesh with the planet wheel (10) and with the ring gear (11), a first member (XP1) of the first input gearbox train (TP1) being selectively, by said input gearbox control means (EP1, EP2, FP1, FP2, FPR), engaged with the input shaft (E) or immobilized or free, a first member (XP2) of the second input gearbox train (TP2) being coupled to the intermediate shaft (M), the two second members (YP1, YP2) of the two input gearbox trains (TP1, TP2) being twinned and selectively, by said input gearbox control means (EP1, EP2, FP1, FP2, FPR), engaged with the input shaft (E) or immobilized or free, whereas the two third members (ZP1, ZP2) of the two input gearbox trains (TP1, TP2) are twinned and selectively, by said input gearbox control means (EP1, EP2, FP1, FP2, FPR), immobilized or free (FIG. 1).

* * * * *